United States Patent
Rausch

(10) Patent No.: US 11,117,443 B2
(45) Date of Patent: Sep. 14, 2021

(54) MULTI-ZONE HVAC MODULE

(71) Applicant: MAHLE International GmbH, Stuttgart (DE)

(72) Inventor: William F. Rausch, Middleport, NY (US)

(73) Assignee: MAHLE International GmbH, Stuttgart (DE)

( * ) Notice: Subject to any disclaimer, the term of this patent is extended or adjusted under 35 U.S.C. 154(b) by 123 days.

(21) Appl. No.: 16/694,294

(22) Filed: Nov. 25, 2019

(65) Prior Publication Data

US 2021/0155075 A1 May 27, 2021

(51) Int. Cl.
*B60H 1/00* (2006.01)
*B60H 1/32* (2006.01)

(52) U.S. Cl.
CPC ....... *B60H 1/00842* (2013.01); *B60H 1/3202* (2013.01); *B60H 1/3211* (2013.01); *B60H 2001/00128* (2013.01); *B60H 2001/00607* (2013.01); *B60H 2001/00942* (2013.01)

(58) Field of Classification Search
CPC .............. B60H 1/00842; B60H 1/3202; B60H 1/3211; B60H 2001/00128; B60H 2001/00607; B60H 2001/00942
See application file for complete search history.

(56) References Cited

U.S. PATENT DOCUMENTS

| | | | |
|---|---|---|---|
| 6,311,763 B1 | 11/2001 | Uemura et al. | |
| 9,724,978 B2 | 8/2017 | Kinmartin et al. | |
| 9,879,870 B2 | 1/2018 | Wang et al. | |
| 2016/0046171 A1 | 2/2016 | Xia et al. | |
| 2018/0029442 A1* | 2/2018 | Inui .................... | B60H 1/00771 |
| 2018/0126820 A1* | 5/2018 | Makimoto ......... | B60H 1/00835 |
| 2020/0114723 A1* | 4/2020 | Tani ................... | B60H 1/00207 |

OTHER PUBLICATIONS

Shikata, Kazushi et al., "Development of Two Layer Flow HVAC Unit," Society of Automotive Engineers, Inc., SAE Technical Paper Series, 1999-01-1199, SAE International, The Engineering Society for Advancing Mobility Land Sea Air and Space, International Congress and Exposition, Detroit, Michigan, Mar. 1-4, 1999, ISSN 0148-7191, 8 pages.

* cited by examiner

*Primary Examiner* — Marc E Norman
(74) *Attorney, Agent, or Firm* — Dickinson Wright PLLC

(57) ABSTRACT

An HVAC module for an automotive vehicle includes a housing defining an air inlet, an upper front zone outlet, a lower front zone outlet, and a rear zone air outlet. An evaporator and a heater downstream of the evaporator are disposed in the housing. The air inlet of the housing is divided by a first divider into an OSA portion exclusively receiving outside air and a REC portion exclusively receiving recycled air. Each of the evaporator and the heater has a respective OSA portion receiving the outside air and a REC portion receiving the recycled air entering the HVAC module through the inlet. A second divider between the evaporator and the heater directs the outside air from the REC portion of the evaporator to the REC portion of the heater. Two temperature doors control access of separate partial streams of the recycled air from the evaporator to the heater.

15 Claims, 2 Drawing Sheets

MULTI-ZONE HVAC MODULE

TECHNICAL FIELD

The present disclosure relates to a heating, ventilation, and air-conditioning module (HVAC module) for an automotive vehicle. In particular, the present disclosure relates to a multi-zone HVAC module.

BACKGROUND

Multi-zone HVAC systems have contributed to efficient air conditioning in automotive vehicles. While running the fan of the high performance HVAC unit at maximum power will supply all zone outlets with sufficient air flow for any operator-requested settings, such HVAC control would consume an undesirably high amount of energy. Various methods have been proposed to supply multiple zones with differing airflow requests at a minimal blower voltage possible.

SUMMARY

The present disclosure provides an arrangement that enables further energy savings by the implementation of a split-flow design for a multi-zone HVAC module.

According to a first aspect, an HVAC module for an automotive vehicle includes a housing defining an air inlet, an upper front zone outlet, a lower front zone outlet, and a rear zone air outlet. An evaporator and a heater downstream of the evaporator are disposed in the housing. The air inlet of the housing is divided by a first divider into an OSA portion exclusively receiving outside air and a REC portion exclusively receiving recycled air. Each of the evaporator and the heater has a respective OSA portion receiving the outside air and a REC portion receiving the recycled air entering the HVAC module through the inlet. A second divider between the evaporator and the heater directs the outside air from the REC portion of the evaporator to the REC portion of the heater. Two temperature doors control access of separate partial streams of the recycled air from the evaporator to the heater.

A first temperature door may control the access of the outside air from the evaporator to the OSA portion of the main heater and simultaneously control a bypass channel for the outside air to variably apportion the outside air to the main heater and to the bypass channel.

The two temperature doors controlling a flow of the recycled air from the evaporator to the REC portion of the main heater may be formed as a second temperature door and a third temperature door, at least one of which simultaneously controls a bypass channel for the recycled air to variably apportion at least one of the partial streams of the recycled air to the main heater and to the bypass channel.

The second temperature door controlling the recycled air from the evaporator to the main heater may be a simple flap valve with the only function to open, close, or partially open an air flow path to the main heater, and wherein the third temperature door variably apportions the recycled air to the main heater and to the bypass channel, while the third temperature valve may have the dual function.

A divider downstream of the OSA portion of the main heater may direct a portion of air passing the OSA portion of the main heater toward a defroster outlet and another portion to the upper front zone outlet.

A separation valve may be placed downstream of the heater. The separation valve may have a valve position, in which recycled air flows to the upper front zone outlet, but not to the defroster outlet. This valve position is used in a mode where maximum cooling is desired. In other modes, the separation valve separates the outside air from the recycled air in the mixing chamber downstream of the heater.

The rear zone outlet may further be split into a first rear zone outlet and a second rear zone outlet and the REC portion of the air inlet is subdivided into three portions, of which one feeds the lower front outlet and the other two feed the first rear zone outlet and the second rear zone outlet respectively.

A vertical partition wall may divide the HVAC module into a driver-side portion and a passenger-side portion so that the evaporator and the main heater both extend through the partition wall and are disposed in both the driver-side portion and the passenger-side portion.

An auxiliary heater disposed downstream of the REC portion of the main heater may provide additional heat on demand.

Accordingly, the HVAC module may comprise a housing defining an air inlet, an upper front zone outlet, a lower front zone outlet, and a rear zone air outlet; an evaporator disposed in the housing downstream of the air inlet; a main heater disposed in the housing downstream of the evaporator; a first, second, and third temperature door, and a divided mixing chamber; wherein the air inlet of the housing is divided by a first divider into two separate portions, with an OSA portion exclusively receiving outside air and a REC portion exclusively receiving recycled air; wherein each of the evaporator and the main heater has a respective OSA portion dedicated to receiving the outside air and a REC portion receiving the recycled air entering the HVAC module through the air inlet, wherein a second divider between the evaporator and the main heater directs the outside air from the REC portion of the evaporator to the REC portion of the main heater; wherein the first temperature door controls access of the outside air from the evaporator to the OSA portion of the main heater and simultaneously controls a bypass channel for the outside air to variably apportion the outside air to the main heater and to the bypass channel, wherein the a second temperature door and the third temperature door control access of separate partial streams of the recycled air from the evaporator to the REC portion of the main heater; wherein the third temperature door simultaneously controls a bypass channel for the recycled air to variably apportion at least one of the partial streams of the recycled air to the main heater and to the bypass channel; and the mixing chamber is divided by a separation valve into an OSA portion and a REC portion downstream of the main heater, wherein the separation valve is configured to be opened to bring the OSA portion and the REC portion of the mixing chamber into fluid communication.

Such an HVAC module may have a full-heat mode, in which the separation valve is closed to separate the OSA portion and the REC portion of the mixing chamber from each other.

The first temperature valve closes the bypass for the outside air and allows access of the outside air to the main heater; the second temperature door allows access of the outside air to the main heater; and the third temperature door closes the bypass channel for the recycled air and allows access of the recycled air to the main heater.

Conversely, such an HVAC module may also have a full-cold mode, in which the separation valve opens a fluid communication between the OSA portion and the REC portion of the mixing chamber, the first temperature valve opens the bypass for the outside air and shuts off the access of the outside air to the main heater; the second temperature door shuts off access of the outside air to the main heater; and the third temperature door opens the bypass channel for the recycled air and shuts off the access of the recycled air to the main heater.

Further details and benefits will become apparent from the following description of an example of a split-flow multi-zone HVAC module. The drawings are provided herewith for purely illustrative purposes and are not intended to limit the invention to the combination of details shown.

DETAILED DESCRIPTION OF THE DRAWINGS

Figure 1:
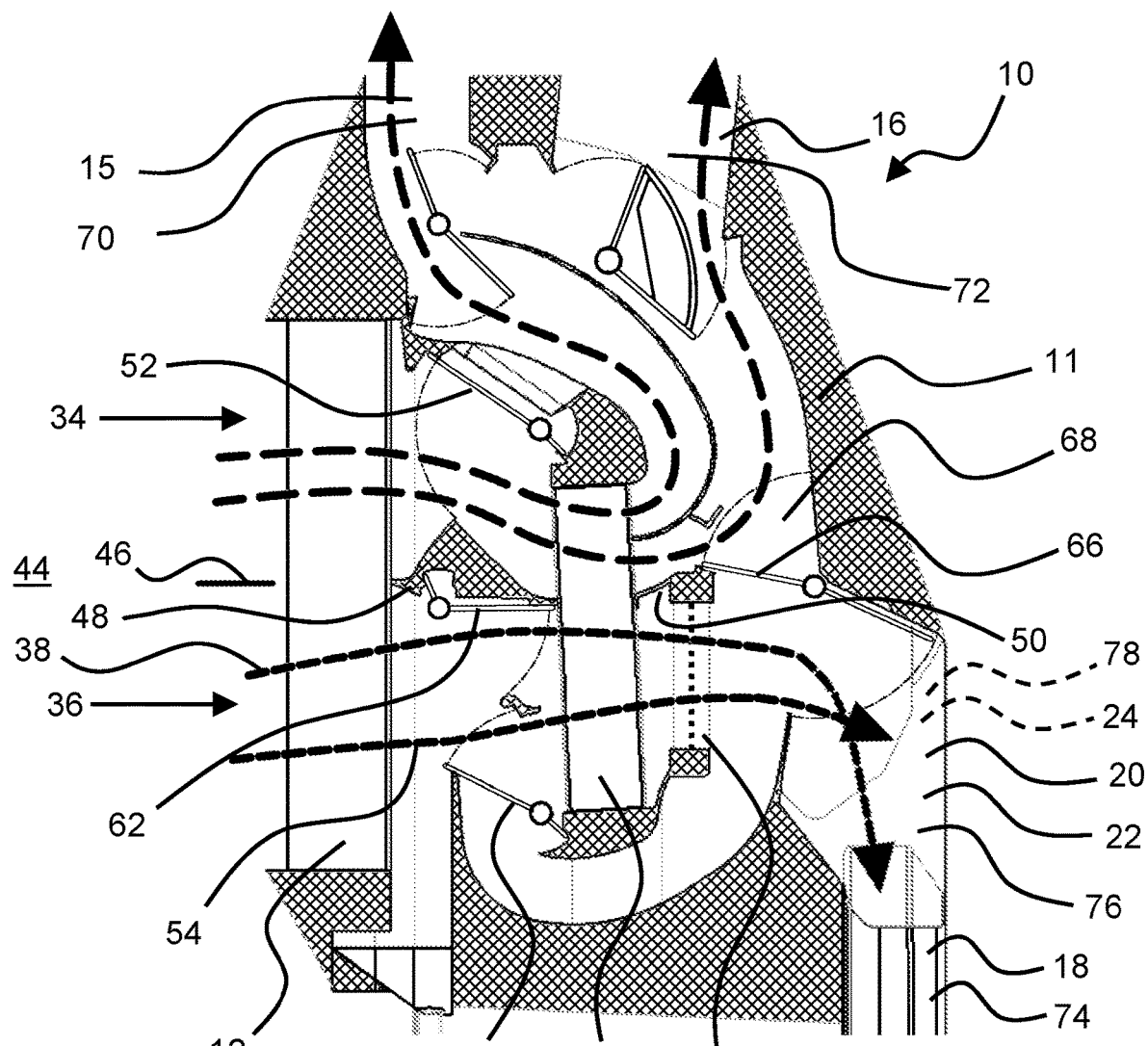
FIG. 1 shows a split-flow HVAC module in a Heater Full Hot mode (HFH mode)
Figure 2:
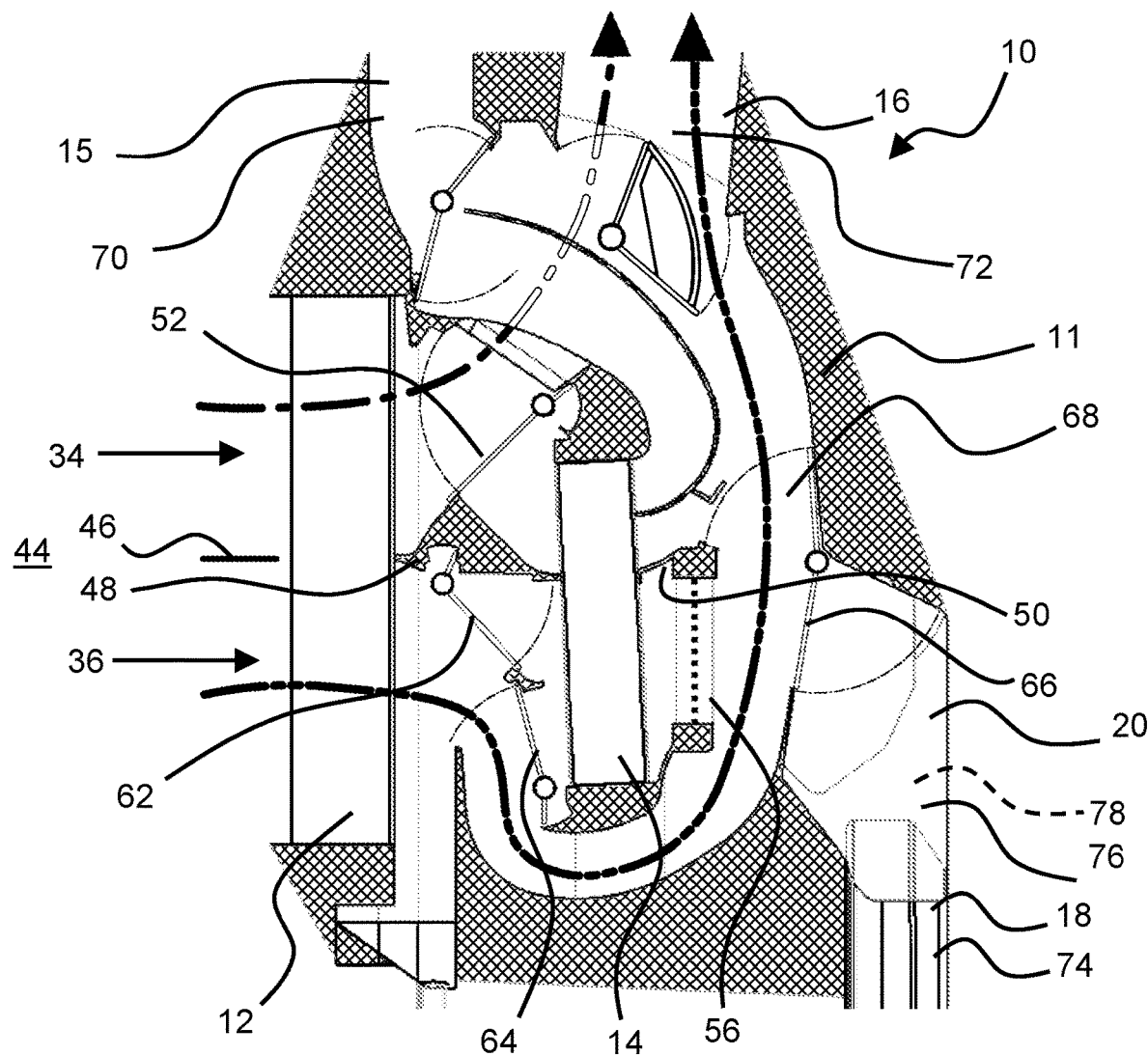
FIG. 2 shows the split-flow HVAC module of FIG. 1 in a Vent Full Cold mode (VFC mode)

Shown in FIGS. 1 and 2 is a longitudinal cross-sectional view of a multi-zone split-flow HVAC module 10 in a housing 11. The term "multi-zone" indicates that a fan (not shown), an evaporator 12, and a main heater 14 are shared to supply conditioned air to various zones of the vehicle's passenger compartment. For example, different zones may be defined as a defroster zone 15, an upper front zone 16, lower front zone 18, and rear zone 20. The rear zone 20 may further be divided into a first rear zone 22 and optionally a second rear zone 24. The first and second rear zones 22 and 24 may, for example, represent upper and lower rear zones or second-row and third-row zones.

Figure 3:
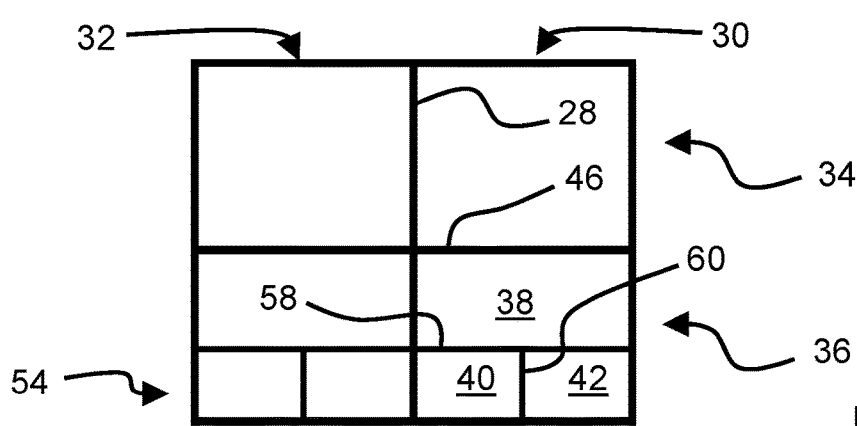
FIG. 3 shows a schematic view of the inlet of the split-flow HVAC module of FIG. 1.

The cross-sectional views of FIGS. 1 and 2 extends through a driver-side portion 30 of the split-flow HVAC module 10 from the front of the vehicle (left) to the rear (right). A vertical partition wall 28 in the background of the shown driver-side portion 30 separates the driver-side portion 30 from a passenger-side portion 32 of the HVAC module 10. The passenger-side portion 32 has an identical structure as the driver-side portion 30 in a mirrored arrangement. FIG. 3 shows a schematic view at the inlet side 44 of the split-flow HVAC module 10, viewed from the front of the vehicle.

The term "split-flow HVAC module" in the context of the present disclosure means that specific regions inside the HVAC module 10 are accessible only to an inflow of an outside air stream OSA 34, while other regions are only accessible to an inflow of a recirculated air stream REC 36. In FIG. 3, partitioned inlets are shown for the OSA stream 34 and the REC stream 36. All inlets are allocated to either the driver-side portion 30 or the passenger side portion 32, and as they are arranged in mirror symmetry, only the driver-side portion 30 will be described.

The OSA stream 34 entering the HVAC module 10 is undivided, while the REC stream 36 is divided into an upper REC portion 38, an inner lower REC portion 40, and an outer lower REC portion 42.

Notably, however, most of the outlets supplied by the HVAC module 10 are accessible to both air flows OSA and REC downstream of the evaporator 12 adjacent to the inlet side of the split-flow HVAC module, depending on valve positions inside the split-flow HVAC module 10 downstream of the evaporator 12.

The split-flow HVAC module 10 includes an HVAC housing containing the evaporator 12 and a main heater 14 spaced from and downstream from the evaporator 12. Access to the evaporator 12 and to the main heater 14 is strictly split between the OSA and REC stream 36s by a first divider 46 upstream of the evaporator 12 and a second divider 48 between the evaporator 12 and the main heater 14 and further a third divider 50 downstream of the main heater 14.

The OSA stream 34 passes through an upper portion of the evaporator 12, while the REC stream 36 passes through a lower portion of the evaporator 12. The OSA stream 34 subsequently passes through the upper portion of the main heater 14 or can bypass the main heater 14 via a first bypass channel, depending on the position of a first temperature door 52. The first temperature door 52 is formed by a flap with two end positions. The position shown in FIG. 1 closes the bypass channel and directs the entire OSA stream 34 to the heater 14. The shown split-flow HVAC module 10 further has an auxiliary heater 56 56 in the REC stream 36. The third divider extends from the main heater 14 to the upper end of the auxiliary heater 56 so that the OSA stream 34 makes no contact with the auxiliary heater 56.

Neither the first, second, and third dividers, nor the vertical partition wall 28 extend through the evaporator 12 or the main heater 14 so that the single evaporator 12 cools the air on both sides of the vertical partition wall 28 and the horizontal dividers, and the main heater 14 heats the air on both sides of the vertical partition wall 28 and of the horizontal dividers. The auxiliary heater 56 may likewise extend on both sides of the vertical partition wall 28, or two auxiliary heaters 56 may be used in the split-flow HVAC module 10.

By keeping the OSA stream 34 and REC stream 36 entering the HVAC module 10 separate, an OSA cold air chamber and an REC cold air chamber are defined in the HVAC housing by the second divider downstream of the evaporator 12 and upstream of the main heater 14, and at least an OSA hot air chamber and an REC hot air chamber are defined downstream of the main heater 14. In the example shown, the OSA air flow is spit only downstream of the main heater 14 into a first OSA hot air chamber and a second OSA hot air chamber.

The first OSA hot air chamber leads to a first outlet 70 controlled by a first mode valve. In an installed state, the first outlet 70 is typically directed toward a vehicle windshield for defogging and defrosting. The first outlet 70 is the only one of the outlets of the HVAC module 10 that is exclusively connected to the OSA stream 34. The second OSA hot air chamber leads to a second outlet 72 controlled by a second mode valve. In the installed state, the second outlet 72 is typically directed toward the torso of a front seat occupant.

The REC stream 36 is also divided in the shown example. The separation, however, is achieved by both a horizontal fourth divider 58, splitting the REC stream 36 into an upper REC portion 34 and a lower REC portion 35, and by a vertical fifth divider 60 splitting the lower REC portion 54 into an inner lower REC portion 40 and an outer lower REC portion 42.

This set-up is schematically indicated in FIG. 3. The upper REC portion 34 and lower REC portion 54 supply separate partial REC streams that pass the evaporator 12 to enter into a joint lower REC cold chamber. The trajectories of the upper and lower partial REC portions 34 and 54, however are directed to different paths downstream of the evaporator 12. A sixth divider downstream of the portion of the evaporator 12 passed by the REC streams 36 separates the upper REC portion 38 and the lower REC portion 54 to be guided to a third outlet 74 directed to the lower front zone 18 or to a fourth outlet 76 and a fifth outlet 78 dedicated to rear zones. As the fourth and fifth outlets 76 and 78 are positioned behind each other in the perspective shown in FIG. 1, only the fourth outlet 76 is visible. Other variants of the split-flow HVAC module 10 combine the fourth and fifth outlets 76 and 78 into a single fourth outlet 76, and the fifth divider may be omitted.

The lower REC portion exiting the evaporator 12 is controlled by two temperature doors, namely a second temperature door 62 controlling the upper REC stream, and a third temperature door controlling the lower REC stream. Where the lower REC stream is divided into an inner REC portion and an outer REC portion, the third temperature door may also be split, or—alternatively—the inner REC portion and outer REC portion may be controlled by a single temperature door. The second temperature door is a flap that controls access of the upper partial REC portion to the heater 14. The third temperature door is positioned at an inlet of a second bypass that allows some or all of the REC stream 36 to bypass the heater 14. The third temperature door has two end positions. One of the two end positions is shown in FIG. 1, where the bypass is closed and all of the REC stream 36 passes through the heater 14.

The auxiliary heater 56 is positioned to be passed by only the REC stream 36. The auxiliary heater 56 may be an electric positive-temperature-coefficient heater (PTC heater) to provide additional heat for lower outlets when desirable. The operation of the auxiliary heater 56 is independent of the operation of the main heater. Preferably, the auxiliary heater 56 is only in operation when the main heater is insufficient. Because heated air rises in the passenger compartment, the heated air from the lower outlets helps heat the entire cabin.

Downstream of the heater 14 and of the first and second bypass channels, hot and cold air are locally mixed and apportioned by several mode valves to the first, second, third, fourth and fifth outlets 70, 72, 74. 76, and 78.

In FIG. 1, the split-flow HVAC module 10 is in a so-called HFH mode (Heater Full Hot mode), which supplies the maximum cold air stream available through the operation of the HVAC module 10. In the HFH mode, all of the temperature doors are in an end position directing both the OSA stream 34 and the REC through the heater 14, while the first and third temperature doors shut off the first bypass channel and the second bypass channel.

A separation valve 66 keeps the REC stream 36 from reaching the first outlet 70 and the second outlet 72 and the OSA stream 34 from reaching the third, fourth and fifth outlets 76 and 78 within a divided mixing chamber 68. Because the REC stream 36 is already heated, concurrently, warm recirculated air is distributed in the vehicle foot spaces in order to keep the vehicle interior sufficiently warm, resulting in a 30% reduction in heating load. The separation valve 66 ensures that the upper frontal outlets, i.e. the first outlet 70 and the second outlet 72, supply air from the OSA stream 34 that is generally drier than the REC stream 36. This ensures reliable defogging of the windshield and fresh air for the front-row occupants.

FIG. 2 shows the split-flow HVAC module 10 in a VFC mode (Vent Full Cold mode). The first temperature door 52 blocks access to the heater 14 by the OSA stream 34 and instead directs the OSA stream 34 to the bypass. The second temperature door 62 and the third temperature door block the REC from entering the heater 14, while the third temperature door simultaneously opens the second bypass channel.

The separation valve 66 is now in a position where it opens a connection between the compartments of the mixing chamber 68 of the OSA stream 34 and the REC stream 36 downstream of the heater 14 and of the first and second temperature doors 52 and 62 and, at the same time, closes off the third, fourth and fifth outlets 76 and 78 leading to the foot zone 18 and the rear zone 20 or rear zones 22 and 24. This allows additional cooled air from the lower partial REC stream to exit the HVAC module 10 through the second outlet 72 for a maximized cooling effect for the front row occupants of the vehicle. In a hot car that needs maximum cooling efforts, the hot windshield cannot become foggy so that the mode valve for the first outlet 70 is closed in order not to divert cool air from the second outlet 72.

While the two extreme modes of the HVAC module 10 have been described and illustrated, intermediate modes are achieved by intermediate positions of the temperature doors 52, 62, and 64. Each of the temperature doors 52, 62, and 64 may have an unlimited number of intermediate positions or a limited number of discrete intermediate positions, where this number may lie, for example, between 3 and 50. The greater the numbers of intermediate positions for the temperature doors 52, 62, and 64 are, the better it is possible to adjust the air temperature at the individual outlets. Likewise, the mode valves at the outlets may have an unlimited number of intermediate positions to control the air flow exiting the outlets, or a limited number of intermediate positions.

In summary, through the unique use of three temperature doors 52, 62, and 64, the heater core can be subdivided into three partitions while maintaining a split flow of the OSA stream 34 and the REC stream 36.

While the above description constitutes the preferred embodiments of the present invention, it will be appreciated that the invention is susceptible to modification, variation and change without departing from the proper scope and fair meaning of the accompanying claims.

The invention claimed is:

1. An HVAC module for an automotive vehicle, the HVAC module comprising:
   a housing defining an air inlet, an upper front zone outlet, a lower front zone outlet, and a rear zone air outlet;
   an evaporator disposed in the housing downstream of the air inlet;
   a main heater disposed in the housing downstream of the evaporator;
   wherein the air inlet of the housing is divided by a first divider into two separate portions, with an OSA portion exclusively receiving outside air and a REC portion exclusively receiving recycled air;
   wherein each of the evaporator and the main heater has a respective OSA portion dedicated to receiving the outside air and a REC portion receiving the recycled air entering the HVAC module through the air inlet;
   wherein a second divider between the evaporator and the main heater directs the recycled air from the REC portion of the evaporator to the REC portion of the main heater; wherein two temperature doors control access of separate partial streams of the recycled air from the evaporator to the REC portion of the main heater.

2. The HVAC module according to claim 1, further comprising a first temperature door controlling access of the outside air from the evaporator to the OSA portion of the main heater and simultaneously controls a bypass channel for the outside air to variably apportion the outside air to the main heater and to the bypass channel.

3. The HVAC module according to claim 1, wherein the two temperature doors controlling a flow of the recycled air from the evaporator to the REC portion of the main heater include a second temperature door and a third temperature door, at least one of which simultaneously controls a bypass channel for the recycled air to variably apportion at least one of the partial streams of the recycled air to the main heater and to the bypass channel.

4. The HVAC module according to claim 3, wherein the second temperature door controlling the recycled air from the evaporator to the main heater is a flap with the only function to open, close, or partially open an air flow path to the main heater, and wherein the third temperature door variably apportions the recycled air to the main heater and to the bypass channel.

5. The HVAC module according to claim 1, further comprising a divider downstream of the OSA portion of the main heater, the divider directing a portion of air passing the OSA portion of the main heater toward a defroster outlet and another portion to the upper front zone outlet.

6. The HVAC module of claim 5, further comprising a separation valve having a valve position, in which recycled air flows to the upper front zone outlet, but not to the defroster outlet.

7. The HVAC module according to claim 1, wherein the rear zone outlet is split into a first rear zone outlet and a second rear zone outlet and the REC portion of the air inlet is subdivided into three portions, of which one feeds the lower front outlet and the other two feed the first rear zone outlet and the second rear zone outlet respectively.

8. The HVAC module according to claim 1, further comprising a vertical partition wall dividing the HVAC module into a driver-side portion and a passenger-side portion, wherein the evaporator and the main heater both extend through the partition wall and are disposed in both the driver-side portion and the passenger-side portion.

9. The HVAC module according to claim 1, further comprising an auxiliary heater disposed downstream of the REC portion of the main heater.

10. The HVAC module according to claim 1, further comprising a mixing chamber divided by a separation valve into an OSA portion and a REC portion downstream of the main heater, wherein the separation valve is configured to be opened to bring the OSA portion and the REC portion of the mixing chamber into fluid communication.

11. The HVAC module according to claim 10, wherein the separation valve simultaneously controls a flow path to at least one of the lower front zone outlet and the rear zone outlet.

12. An HVAC module for an automotive vehicle, the HVAC module comprising:
a housing defining an air inlet, an upper front zone outlet, a lower front zone outlet, and a rear zone air outlet;
an evaporator disposed in the housing downstream of the air inlet;
a main heater disposed in the housing downstream of the evaporator;
wherein the air inlet of the housing is divided by a first divider into two separate portions, with an OSA portion exclusively receiving outside air and a REC portion exclusively receiving recycled air;
wherein each of the evaporator and the main heater has a respective OSA portion dedicated to receiving the outside air and a REC portion receiving the recycled air entering the HVAC module through the air inlet;
wherein a second divider between the evaporator and the main heater directs the outside air from the REC portion of the evaporator to the REC portion of the main heater;
further comprising:
a first temperature door controlling access of the outside air from the evaporator to the OSA portion of the main heater and simultaneously controls a bypass channel for the outside air to variably apportion the outside air to the main heater and to the bypass channel
a second temperature door and a third temperature door controlling access of separate partial streams of the recycled air from the evaporator to the REC portion of the main heater; the third temperature door simultaneously controlling a bypass channel for the recycled air to variably apportion at least one of the partial streams of the recycled air to the main heater and to the bypass channel; and
a mixing chamber divided by a separation valve into an OSA portion and a REC portion downstream of the main heater, wherein the separation valve is configured to be opened to bring the OSA portion and the REC portion of the mixing chamber into fluid communication.

13. The HVAC module according to claim 12, wherein the HVAC module has a full-heat mode, in which
the separation valve is closed to separate the OSA portion and the REC portion of the mixing chamber from each other,
the first temperature valve closes the bypass for the outside air and allows access of the outside air to the main heater;
the second temperature door allows access of the outside air to the main heater; and
the third temperature door closes the bypass channel for the recycled air and allows access of the recycled air to the main heater.

14. The HVAC module according to claim 12, wherein the HVAC module has a full-cold mode, in which
the separation valve opens a fluid communication between the OSA portion and the REC portion of the mixing chamber,
the first temperature valve opens the bypass for the outside air and shuts off the access of the outside air to the main heater;
the second temperature door shuts off access of the outside air to the main heater; and
the third temperature door opens the bypass channel for the recycled air and shuts off the access of the recycled air to the main heater.

15. The HVAC module according to claim 12, further comprising an auxiliary heater disposed downstream of the REC portion of the main heater, wherein the auxiliary heater is selectively operable independently of the main heater.

* * * * *